(12) United States Patent
Mehrl

(10) Patent No.: US 8,542,427 B2
(45) Date of Patent: Sep. 24, 2013

(54) IMAGE PROJECTION USING CURVED REFLECTIVE SURFACES

(75) Inventor: David Joseph Mehrl, Plano, TX (US)

(73) Assignee: Texas Instruments Incorporated, Dallas, TX (US)

(*) Notice: Subject to any disclaimer, the term of this patent is extended or adjusted under 35 U.S.C. 154(b) by 0 days.

(21) Appl. No.: 13/602,780

(22) Filed: Sep. 4, 2012

(65) Prior Publication Data

US 2012/0327376 A1 Dec. 27, 2012

Related U.S. Application Data

(62) Division of application No. 11/615,301, filed on Dec. 22, 2006, now Pat. No. 8,259,382.

(51) Int. Cl.
*G02B 26/00* (2006.01)

(52) U.S. Cl.
USPC .......................................... 359/291

(58) Field of Classification Search
USPC .......................................... 359/912
See application file for complete search history.

(56) References Cited

U.S. PATENT DOCUMENTS

| 2003/0222980 | A1 | 12/2003 | Miyagaki et al. | |
| 2005/0231789 | A1* | 10/2005 | Patel et al. | 359/290 |
| 2006/0268389 | A1* | 11/2006 | Huibers | 359/291 |

* cited by examiner

*Primary Examiner* — James Jones
(74) *Attorney, Agent, or Firm* — Warren L. Franz; Wade J. Brady, III; Frederick J. Telecky, Jr.

(57) ABSTRACT

A system for projecting images has an illumination system for providing light, a spatial light modulator including an array of individually addressable pixel modulator elements with curved reflective surfaces, and projection optics for projecting the modulated light to form the image, wherein no focal planes of the projection optics are aligned to the reflective surfaces of the pixels.

14 Claims, 10 Drawing Sheets

FRAME 2 $t=t_0 + T/2$

FRAME 0 $t=t_0$

FRAME 3 $t=t_0 + 3T/4$

FRAME 1 $t=t_0 + T/4$

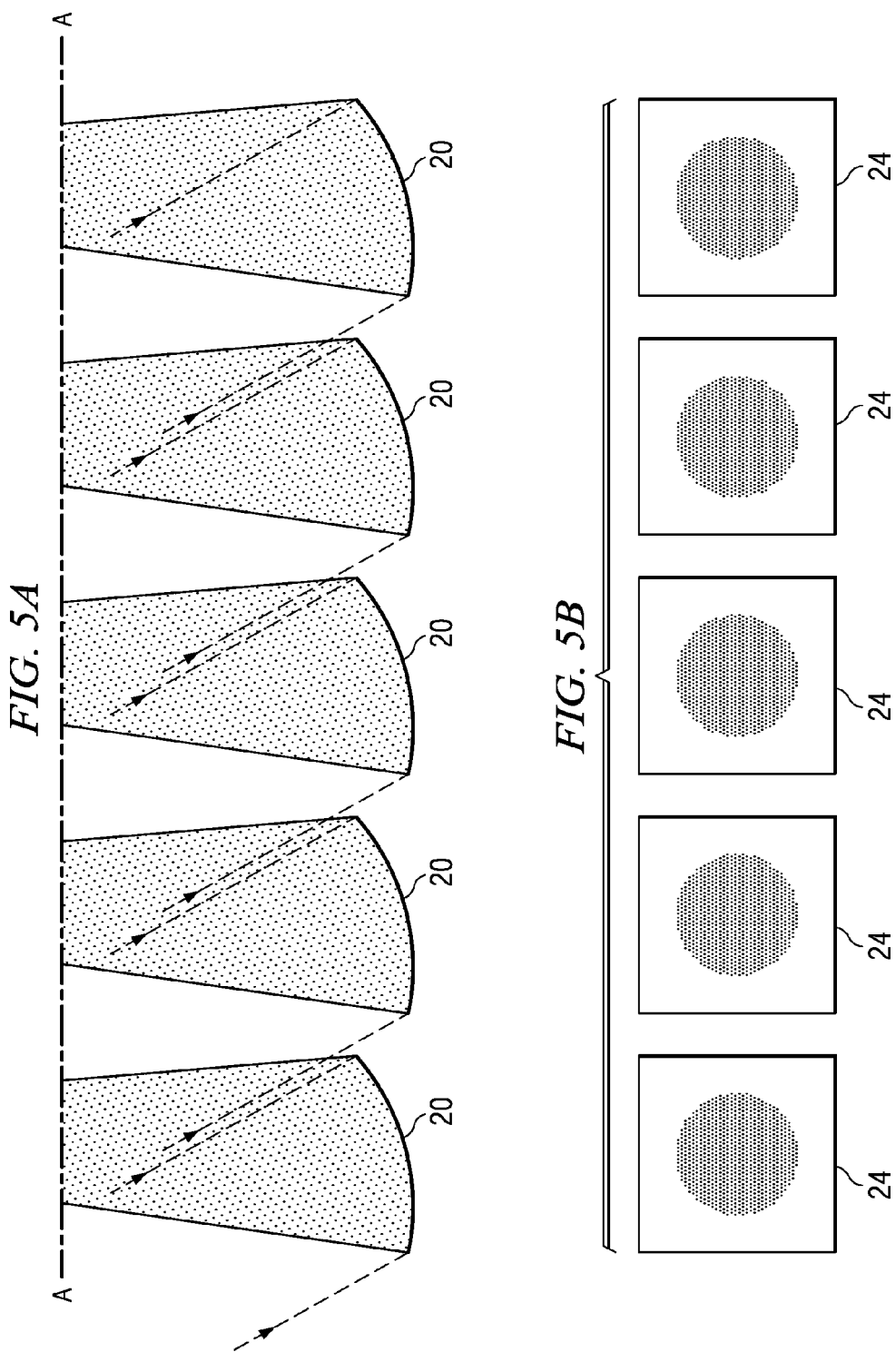

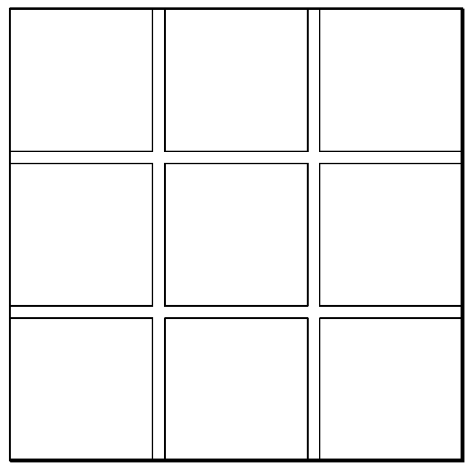
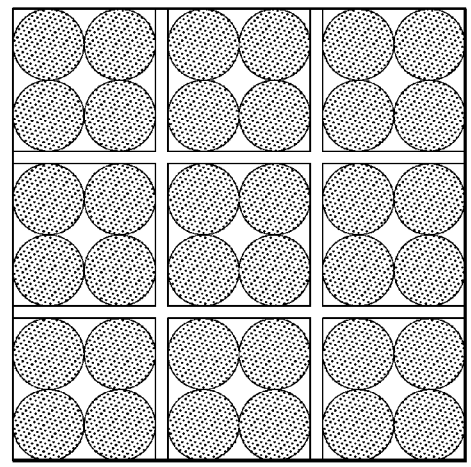
*FIG. 6A*   *FIG. 6B*
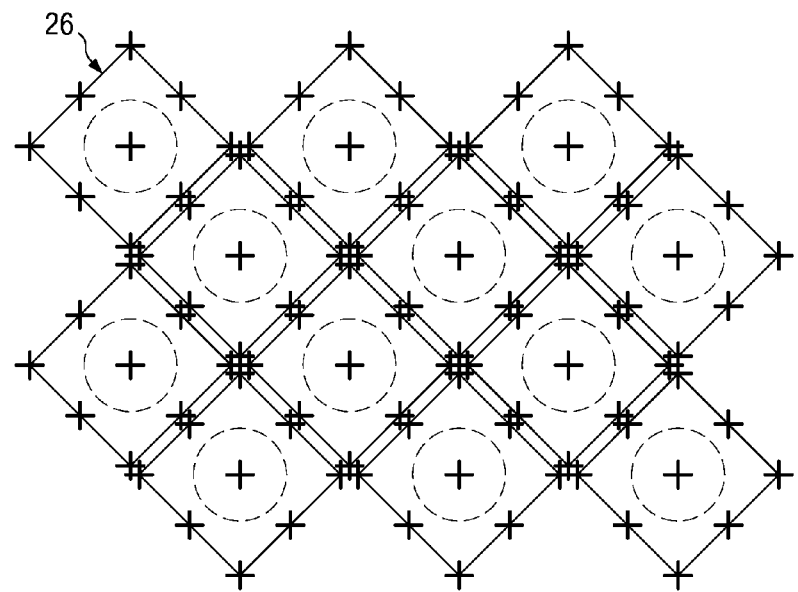
*FIG. 7A*

IMAGE PROJECTION USING CURVED REFLECTIVE SURFACES

This application is a division of application Ser. No. 11/615,301, filed Dec. 22, 2006, the entirety of which is hereby incorporated by reference.

BACKGROUND

The technical field of the examples to be disclosed in the following sections is generally related to the art of image projection, and more particularly, to method of projecting images using individually addressable pixels having curved reflective surfaces.

Projection systems using spatial light modulators having individually addressable pixels each of which has a reflective surface, such as micromirrors, produce images by modulating light beams with the pixels. Resolution of the produced images is determined by the total number of addressable pixels involved in producing the image. However, the number of addressable pixels in a single spatial light modulator is subject to many limitations in both manufacturing and device design.

An advanced approach for obtaining high perceived resolution of the produced images, for example, using a spatial light modulator with a lower resolution to accomplish produced images with a higher perceived resolution, is by projecting images of the pixel array of the spatial light modulator onto different locations on the screen. Viewer's eyes integrate the interlaced pixel images of the array, and perceive a high resolution. This approach, however, has many disadvantages, which is demonstrated in FIG. 1A to FIG. 1F.

For demonstration purpose, assuming image 10 with 4×4 resolution is to be produced as shown in FIG. 1A. Each square represents an image pixel with solid and shaded squares presenting "white" and "black" pixels. This image can be produced using a spatial light modulator with lower resolution, such as 2×2 pixel array 12. The corresponding images ($P_1$, $P_2$, $P_3$, and $P_4$) of the 2×2 pixel array is shown in FIG. 1B. The images of the 2×2 pixel array are circulated to different locations as shown in FIG. 1C to FIG. 1E. Specifically, at time $t=t_0$, the image of the 2×2 pixel array is located at the upper left corner and frame 0 is loaded to display the first pattern. At time $t=t_0+T/2$ with T being the moving period, the image of the 2×2 pixel array is moved to the bottom left corner; and frame 1 is loaded to display the second pattern. At time $t=t_0+T/4$ the image of the 2×2 pixel array is moved to the bottom right corner; and frame 2 is loaded to display the third pattern. At time $t=t_0+3T/4$ the image of the 2×2 pixel array is moved to the upper right corner; and frame 3 is loaded to display the third pattern. If the entire moving cycle is fast enough, for example faster than the flicker time of human eyes, viewer's eyes integrate the four interlaced patterns without perceiving the moving. The viewer perceives the produced image having a resolution of 4×4.

This approach has disadvantages, one of which is low "fill factor" of the pixels in the spatial light modulator. Fill factor is referred to as the ratio between the total area of the pixels of the pixel array in the spatial light modulator and the total area of the pixel array. In the example as shown in FIG. 1F, the fill factor of the pixel array is calculated as the reflective area of the nine pixels to area 13 of the nine pixel array.

When the above technique is employed to achieve a higher perceived image resolution using a pixel array with a lower resolution (the total number of individually addressable pixels in the array), the area of the individual pixel has to be reduced in order to avoid superposition of the image pixels at different locations. Avoiding such image pixel superposition is critical to contrast ratio of the produced images. Reduction of the individual pixel area, however, increases the gaps between the pixels. The increased gap, in turn, reduces the fill factor, and degrades the system contrast ratio by exposing more non-reflective areas (e.g. areas introducing light scattering) to the incident illumination light. For the array of micromirrors, such as DMD, as an example, the fill factor can be reduced to 25%, as schematically illustrated in FIG. 1F. This problem can be exasperated when the illumination light incident onto the pixels and to be modulated exhibits angular expansion (which is often the case), as schematically illustrated in FIGS. 2A and 2B.

Referring to FIG. 2A, collimated incident light beams 14 are reflected by flat (non-curved) reflective surface 18 of a pixel that is an addressable micromirror. The reflected light beams extend spatially as it propagates. The overall profile of the reflected light beam in a plane parallel to and above the mirror plate is extended, as shown in FIG. 2B, wherein the cross-section of each reflected beam intersected by the plane is illustrated with dash-line circles. As a result, the image of the mirror plate generated from the over all profile of the reflected light beams is larger than the physical size of the mirror plate. Because the overall profile is larger than the physical size of the mirror plate, the illumination intensity of the image pixel corresponds to the mirror plate may be reduced, as well as the contrast ratio.

SUMMARY

As an example, a projection system is disclosed herein. The system comprises: an illumination system providing light; an array of micromirrors for modulating the light so as to produce an image, wherein each micromirror has a curved reflective surface; and a projection optics for projecting the modulated light to form the desired image, wherein no focal planes of the projection optics is aligned to the reflective surfaces of the micromirrors.

As another example, a method for producing an image using an array of micromirrors each having a curved reflective surface is disclosed. The method comprises: directing a beam of light onto the curved surfaces of the micromirror array; modulating the light beams using the micromirrors based on the image; and disposing a projection optics at a location such that a focal plane of the projection optics is away from the reflective surfaces; and projecting a set of images of the curved surfaced, but not the curved surfaces, onto a screen for viewing.

As yet another example, a method for producing an image using an array of micromirrors each having a curved reflective surface is disclosed herein. The method comprises: directing a beam of light onto the curved surfaces of the micromirror array; modulating the light beams using the micromirrors based on the image; projecting the modulated light onto different locations on a screen so as to display the image; and wherein an overlap of the modulated light on the screen is 30% or less when the micromirror array has a fill factor of 85% or more.

BRIEF DESCRIPTION OF THE DRAWINGS

FIG. 5A illustrates an array of curved reflective surfaces in reflecting incident light beams at an ON state;

FIG. 5B illustrates the images of the curved reflective surfaces generated by the converged light beams in FIG. 5A;

FIG. 6A illustrates an exemplary array of pixels each of which has a curved reflective surface;

FIG. 6B schematically illustrates an image produced by the pixel array of FIG. 6A, wherein produced image has a higher resolution than the resolution of the pixel array;

FIG. 7A and FIG. 7B schematically illustrates an exemplary method of producing high resolution images using low resolution pixel arrays;

DETAILED DESCRIPTION OF SELECTED EXAMPLES

Figure 1A:
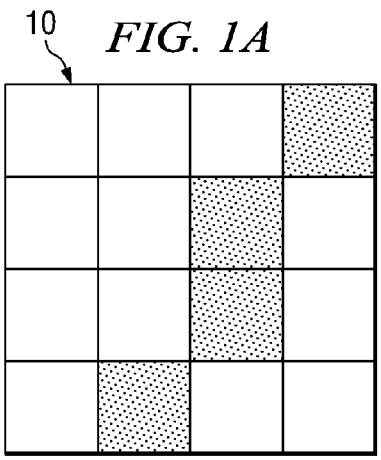
FIG. 1A illustrates an image produced by an array of pixels with a resolution lower than the perceived resolution of the image.
Figure 1D:
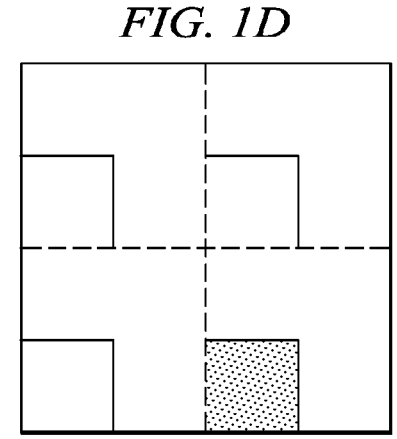
FIG. 1B to FIG. 1E illustrate a method of producing the image of FIG. 1A using a pixel array with a lower resolution.
Figure 1B:
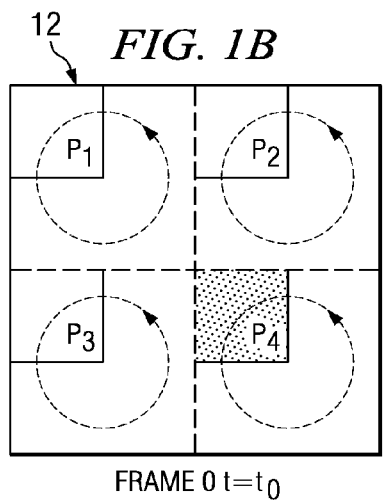
Figure 1E:
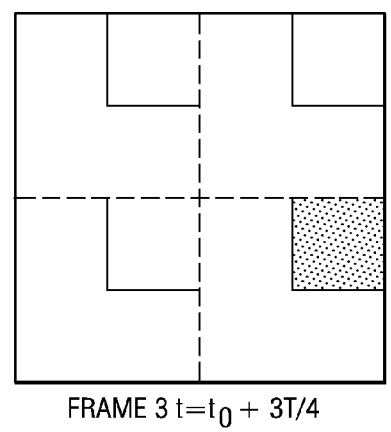
Figure 1C:
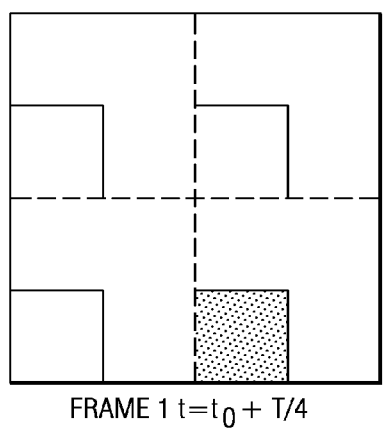
Figure 1F:
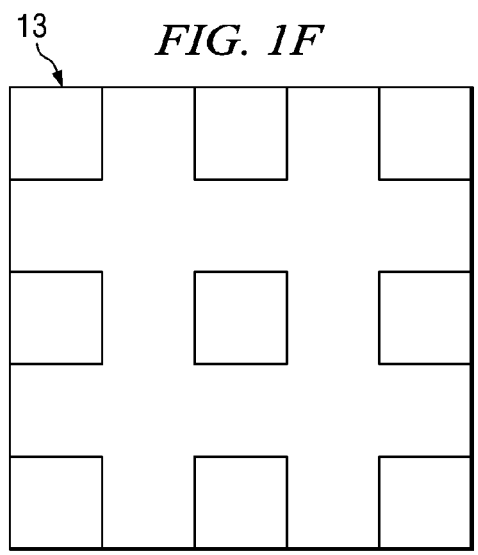
FIG. 1F illustrates another exemplary pixel array having reduced pixel areas.
Figure 2A:
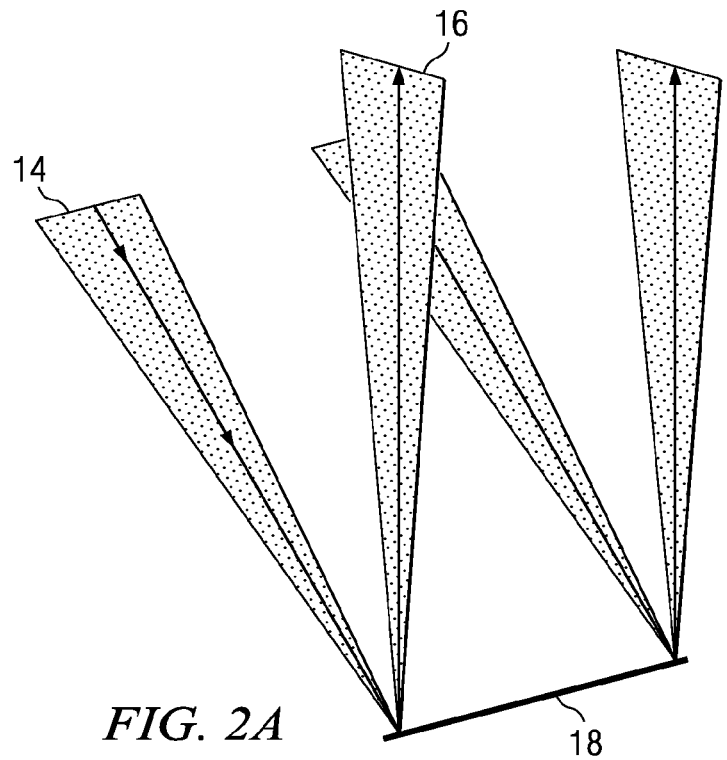
FIG. 2A demonstrates reflection of an incident beam reflected from a flat reflective surface of a micromirror pixel.
Figure 2B:
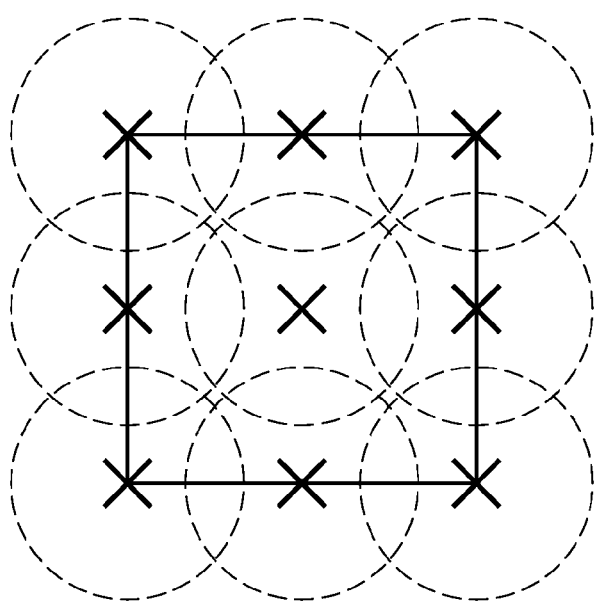
FIG. 2B illustrates a top view of the reflective surface in FIG. 2A with the profile of the reflected light beams therefrom.
Figure 3B:
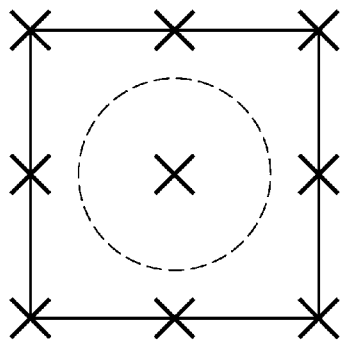
FIG. 3B illustrates a top view of the reflective surface in FIG. 3A with the profile of the reflected light beams therefrom.
Figure 3A:
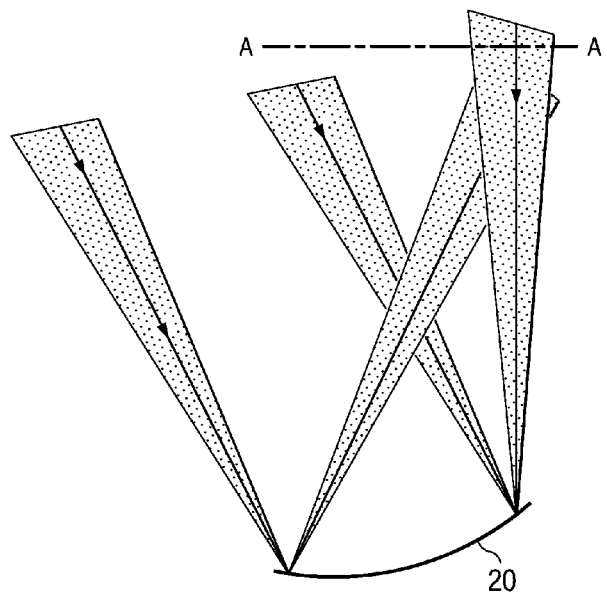
FIG. 3A illustrates the illumination light beams reflected from a curved reflective surface.

Referring to the drawings, FIG. 3A schematically illustrates a reflective surface (20) of a pixel for use in producing images. In this example, the curved surface has a curvature towards the incident light (hereafter concave surface). Incident light beams with angular extension are converged spatially onto real image plane AA that is parallel to and above the plane on which the reflective surface is located or formed. On the real image plane, the overlap of the converged light beams defines the image of the curved mirror plate. This pixel image, since formed by converged light beams, has dimension smaller than the physical dimension of the corresponding pixel, as shown in the dash-line circle in FIG. 3B. Moreover, the radiation energy of the reflected light at plane AA is constrained within the pixel image. This energy constraint results in higher illumination intensity per pixel image; and capability of higher contrast ratio of the display system.

Figure 4B:
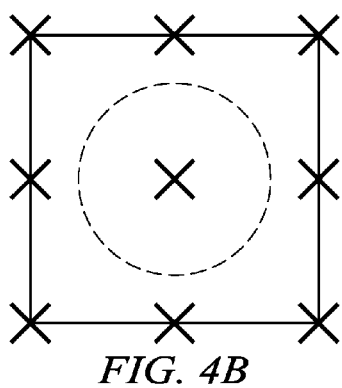
FIG. 4B illustrates a top view of the reflective surface in FIG. 4A with the profile of the reflected light beams therefrom.
Figure 4A:
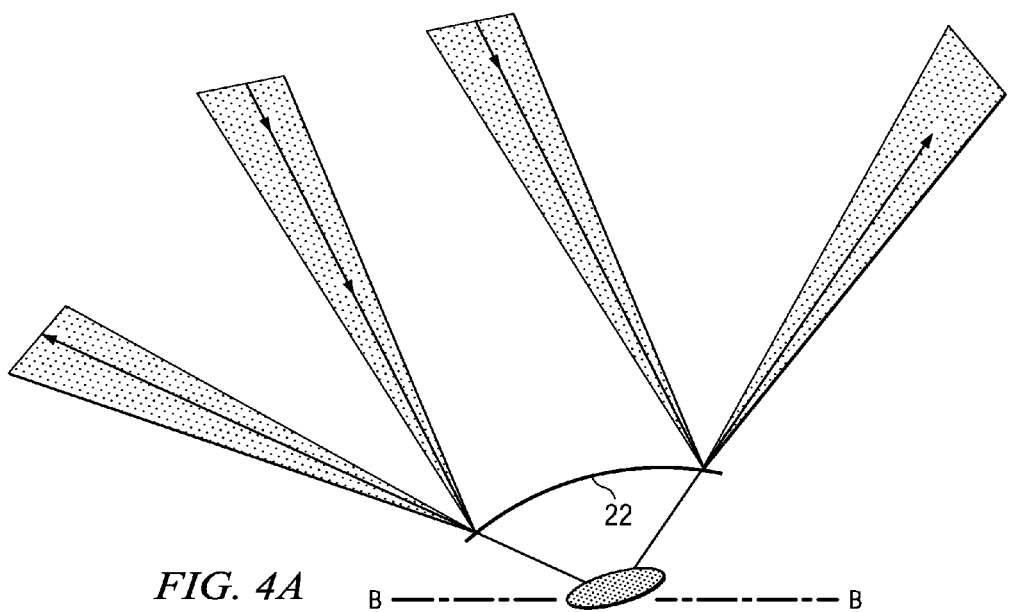
FIG. 4A illustrates the illumination light beams reflected from another curved reflective surface.

Other than curving toward the incident light, the reflective surface can also be curved away from the incident light, as shown in FIG. 4A. Referring to FIG. 4A, reflective surface of a micromirror device has a convex curvature away from the incident light beams. Backward extensions of the reflected light beams converge at an imaginary image plane BB. This imaginary image plane is parallel to and below the plane on which the micromirror having the curved reflective surface is positioned or formed. Similar to the image as shown in FIG. 3B, this imaginary pixel image, since also formed by converged light beams, has a smaller dimension than the physical dimension of the corresponding pixel, as shown in the dash-line circle in FIG. 4B.

FIG. 5A illustrates an array of curved reflective surfaces of an array of micromirrors in FIG. 4A at an ON state; and the reflected incident light beams are converged onto the imaging plane AA. Another state—the OFF state can be defined as a state wherein the reflected light beams from the mirror plates are reflected away from the display target. At plane AA or BB, the reflected incident light beams converge, resulting in an array of real image mirror plates, as shown in FIG. 5B. As shown in FIG. 5B, images of the micromirrors with curved reflective surfaces are smaller than those of micromirrors with flat reflective surfaces, which are shown as squares in the figure. This reduced pixel images allows for pixels with larger reflective surfaces in the array than pixels with flat (non-curved reflective surfaces), which in turn, enables higher fill factor and/or illumination intensity, and higher contrast ratio of the display system.

FIG. 6A schematically illustrates a top view of an array of micromirror pixels with curved reflective surfaces as disclosed herein. For simplicity purpose, only 3×3 pixels are shown in the figure. It will be appreciated by those skilled in the art that the pixel array may comprise any desired number of pixels. For example, the micromirror arrays used in display systems may have thousands or millions of micromirrors, the total number of which determines the resolution of the displayed images. For example, the micromirror array of the spatial light modulator may have 512×384 or more, 640×360 or more, 1024×768 or more, 1280×720 or more, 1400×1050 or more, 1600×1200 or more, 1920×1080 or more, or even larger number of micromirrors. In other applications, the micromirror array may have less number of micromirrors. The aspect ratio (the ratio of the number of rows to number of columns in the array) can be standard 4:3 or 16:9 or any desired numbers. It is noted that for properly producing the desired images, the image plane (e.g. AA or BB) is expected to be on the focal plane of the projection lens (or on a focal plane of a projection assembly having a collection of optical lenses for projecting the modulated light from the reflective surfaces onto a screen for viewing) of the system, instead of the physical curved reflective surfaces.

Using the projection method as described with reference to FIG. 1B to FIG. 1E by projecting the images (e.g. on plane AA or BB as shown in FIG. 3A and FIG. 4A) of the curved reflective surfaces onto different locations on the target screen, images of higher resolution can be achieved, as shown in FIG. 6B. In this particular example, the produced image may have a perceived resolution of 6×6. In fact, the perceived resolution can be other values depending on number of different locations at which images of the curved reflective surfaces are projected.

Because the pixels of the produced image are formed by curved reflective surfaces, the micromirror array can have a high fill factor without causing much overlapping of the projected image pixels. In an example, the pixel array has a fill factor of 85% or more, such as 90% or more, and more particularly 95% or more; while the produced pixel images of the image having a higher perceived resolution have overlap that is 30% or less, more preferably 20% or less, 10% or less, 5% or less, or 1% or less, or substantially zero.

Pixels can be arranged in the pixel array in many ways. In the example as shown in FIG. 6A, the pixels are arranged within a rectangle area; and the edges of the rectangular pixels are parallel to the edges of the rectangular area (or array). In another example, the pixels can be arranged in the array such that each rectangular pixel is rotated 35° to 55° degrees along an axis passing through the geometric center of the pixel and perpendicular to the mirror plate, as shown in FIG. 7A.

Figure 7B:
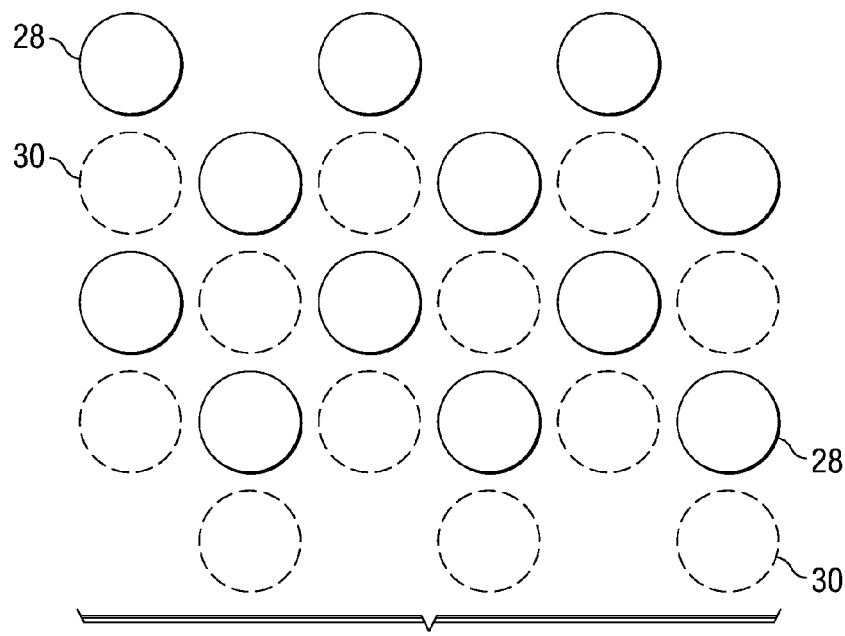
Figure 12:
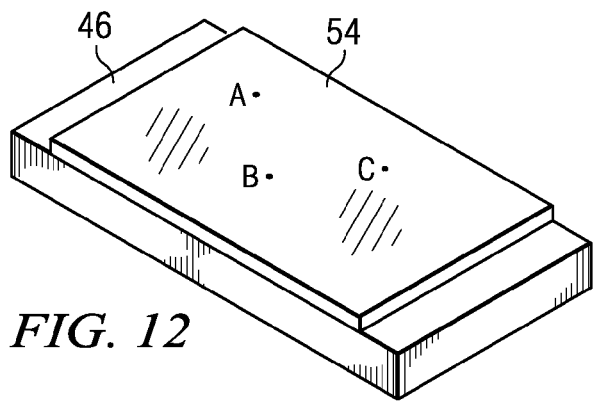
FIG. 12 schematically illustrates a perspective view of the package in FIG. 11 wherein the transmissive package lid has defects or contaminations.

Referring to FIG. 7A, 12 micromirror pixels of the array are illustrated for simplicity and demonstration purposes. Because the micromirrors are rotated, none of the edges of the mirror plates of the micromirrors in the micromirror array are parallel to any edges of the micromirror array. Images of the curved reflective surfaces of the micromirrors are illustrated by the dash-line circles; and superimposed on the micromirror surfaces. An exemplary projection method of using the micromirrors in FIG. 7A is illustrated in FIG. 7B for obtaining images with the perceived resolution higher than the resolution of the micromirror pixel array.

Referring to FIG. 7B, first pixel pattern is generated and projected at location 28 in the display target at time $T_1$, which is represented by the closed circles. After time $T_1$ and during time $T_2$, the second pixel pattern is generated and projected at location 30 other than position 28 in the display target. The first and second pixel patterns are located such that each pixels of the second (and first) pixel pattern is surrounded by four (or other number) of the pixels from the first (and the second) pixel pattern. Such projection cycle is repeated such that the perceived resolution of the projected image and/or video has a resolution higher than the number of pixels in each pixel pattern.

Figure 8A:
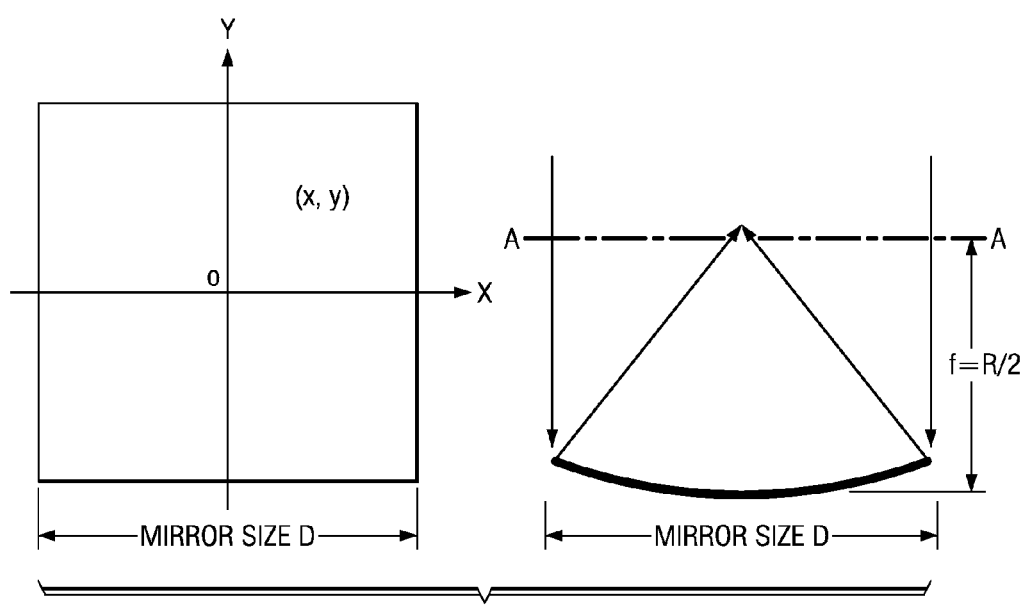
FIG. 8A and FIG. 8B demonstrate geometric configuration of a curved reflective surface.
Figure 8B:
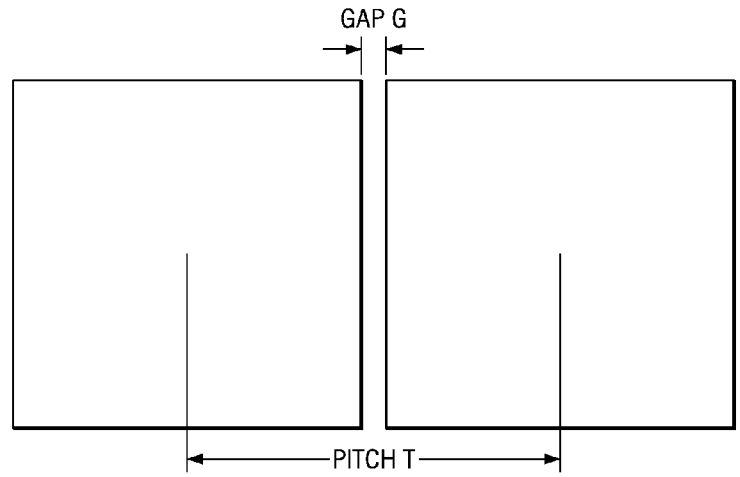

FIG. 8A and FIG. 8B schematically illustrates quantitative description of the curved reflective surfaces. Referring to FIG. 8A, a side view of a curved reflective surface is illustrated therein. The top view of the reflective surface has a rectangular shape (e.g. square); and points in this top view can be represented by (x, y) coordinates in a Cartesian coordinate, as shown in the figure. The reflective surface has a focal length f that can be expressed as f≈R/2 with R being the radius of the curved surface. Plane AA is the focal plane of the curved surface.

In the array of micromirrors having curved surfaces as shown in FIG. 8A, the pitch size of the array is defined as the center-to-center distance between two adjacent micromirrors (or reflective surfaces); and the gap is defined as the smallest distance between the two adjacent micromirrors. It is noted that the gap and pitch size may vary in different directions, for example, they can be different in the column and row directions of the array.

For maximizing the performance of the micromirrors with curved reflective surfaces in producing images at a high resolution, contrast ratio, and illumination intensity, the curved reflective surfaces have preferred curvature ranges. As an example, the reflective surface can have a curvature such that the image of the reflective surface to be projected onto a screen has a size approximately half the pitch size T. To give an example of estimating such curvature, the following discussion assumes a squared top view of the reflective surface, and collimated incident light; and the discussion is on one-dimension without losing the spirit or generality.

The curved reflective surface can be simulated as a concave reflective lens in that it follows the Fourier Transformation theory in acting on the incident light beams. The reflective surface profile can be given by the rect-function in Fourier Transformation: rect (x/$k_d$T), wherein x is the lateral coordinate in the Cartesian coordinate; $k_d$ is the fill factor of the micromirror array; and T is the pitch size of the array. The rect- function is defined as:

$$rect(s) = \begin{Bmatrix} 1, & |s|<0.5 \\ 0, & |s|>0.5 \end{Bmatrix},$$ (Eq. 1)

wherein $s$ is the variable $k_d$ can be 85% or more, 90% or more, 95% or more. For example, for a 10 microns pitch size micromirror with 0.5 micron gap in a micromirror array wherein the micromirrors are substantially square, the fill factor can be calculated as $k_d$=(10−0.5)/10=0.95.

At the focal plane of the reflective surface, the wave-front field can be described as:

$$F\{rect(\frac{x}{k_d}T)\}|_{f_x=\frac{x_f}{\lambda f}}$$ (Eq. 2)

wherein F is the Fourier Transformation operator; $f_x$ is the spatial frequency variable. This Fourier Transformation is often referred to as the sinc function in the related field.

Given the field expression in equation 2, the illumination light field in the focal plane can be expressed as:

$U_f(f_x)=K\mathrm{sinc}(k_d T f_x)$ (Eq. 3)

By substituting $f_x$ with $x_f/\lambda f$, equation 3 can be reduced to equation 4.

$U_f(f_x)=K\mathrm{sinc}(k_d T x_f/\lambda f)$ (Eq. 4)

wherein K is a constant; and sinc is defined as:

$$sinc(x) = \frac{\sin(\pi x)}{\pi x}$$

The width or spot size S of the resulting sinc distribution is commonly accepted to be the range of values that drive the argument of the sinc function between ±1, such as S=2×(λf/$k_d$T). Setting the spot size, for example, to half the pitch size T, and substituting in a value of R/2 for f, the following equation can be obtained:

$$2\lambda\left(\frac{R}{2k_d T}\right) = \frac{T}{2}$$ (Eq. 5)

Equation 5 gives that R=$k_d T^2$/(2λ). As an example, R is 87 microns with $k_d$=0.95, T=10 microns; and λ=540 nm. This can be shown to correspond to a peak mirror height derivation of: Δ=R (1−cos(T/2R)). Using the above parameters Δ is 0.143 micron.

In the interest of robustness and process tolerance, a smaller curvature of the curved reflective surface than the desired curvature (e.g. the ideal value) can be used, which results in an even smaller spot size (image of the reflective surface) at the focal plane. This arises from the natural "process variations" that often occur in manufacturing, wherein the targeted radius of curvature of the reflective surface may not always be precisely met, e.g. the curvature may be slightly offset higher or lower than the targeted value. However, by intentionally targeting a slightly smaller radius of curvature (or equivalently making the reflective surface to be slightly smaller than the targeted value, the illumination spot (area) can become smaller than the desired value. This enables adjustment of the illumination spot (area) on the screen to match the desired value by defocusing of the projection optics, which is better illustrated in FIG. 8C.

Figure 8C:
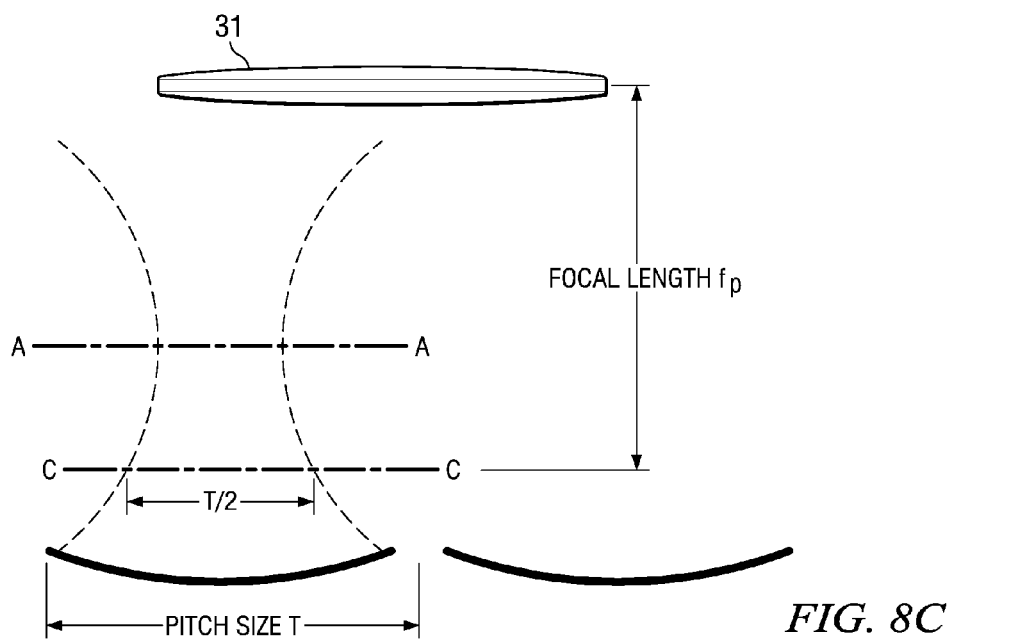
FIG. 8C illustrates an exemplary optical arrangement of the curved surface and projection lens of the display system so as to obtain desired profiles of images of the curved reflective surfaces.

Referring to FIG. 8C, projection lens 31 can be disposed on the optical path of the system between the reflective surfaces and the screen such that the focal plane CC of the projection lens is offset from the focal plane AA of the curved reflective surfaces. It is noted that projection lens 31 is for demonstration purpose. Projection lens 31 can be a projection assembly having a collection of optical lenses for projecting the modulated light from the reflective surfaces onto a screen for viewing. In this instance, the focal plane CC of the projection assembly is referred to as the focal plane defined by all optical lenses of the projection assembly. In particular, plane CC can be higher (i.e. between the projection lens and plane AA) or lower than plane AA (i.e. plane AA is between plane CC and the projection lens). Plane CC lies in a position such that the image of the curved reflective surface on plane CC has the desired dimension, such as T/2. In fact, any other sizes smaller than the physical size of the curved reflective surface can be achieved by adjusting the distance between the projection lens and the curved reflective surface.

Figure 8D:
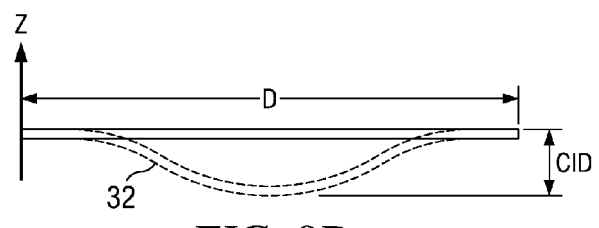
FIG. 8D and FIG. 8E schematically illustrate a curved reflective surface.
Figure 8E:
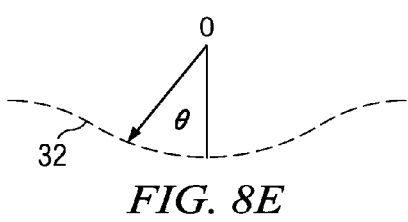

FIG. 8D and FIG. 8E schematically illustrates another quantitative description of the curved reflective surfaces. The curvature can be quantitatively characterized by the radius of curvature and/or the curvature-induced-displacement (CID), which is illustrated in FIG. 8D. Referring to FIG. 8D, the CID is defined as the displacement of the center of the mirror plate from the non-curved position. The CID can be mathematically expressed as:

$$CID = \frac{1}{2} k \times \left(\frac{D}{2}\right)^2$$

wherein k is a constant, and D is the diameter of the mirror plate.

The curvature of the mirror plate can also be characterized by the changes of the surface normal, represented by angle θ in FIG. 8E. The curved reflective surfaces of the micromirrors can have a surface normal that changes across the curved reflective surface by at least 1/12 of the maximum angle of deflection of the micromirrors, or at least 1/6 of the maximum angle of deflection of the micromirrors, or at least 1/3 of the maximum angle of deflection of the micromirrors. The curved reflective surfaces of the micromirrors have a surface normal that changes by at least 2 degrees or more, or 3 to 6 degrees across the curved reflective surface. The curved reflective surfaces of the micromirrors have a radius of curvature of less than 20 times, or 10 times, or 7.5 times the micromirror pitch, where the micromirror pitch is defined as the center to center distance between adjacent micromirrors. It is noted that the curvature can be positive or negative.

The curved mirror plate can be fabricated in many ways. For example, the mirror plate can be fabricated by two or more plate layers of different mechanical and/or thermal properties. Specifically, the multiple layers can be of different compression and tensile strains, as shown in FIG. 9.

Figure 9:
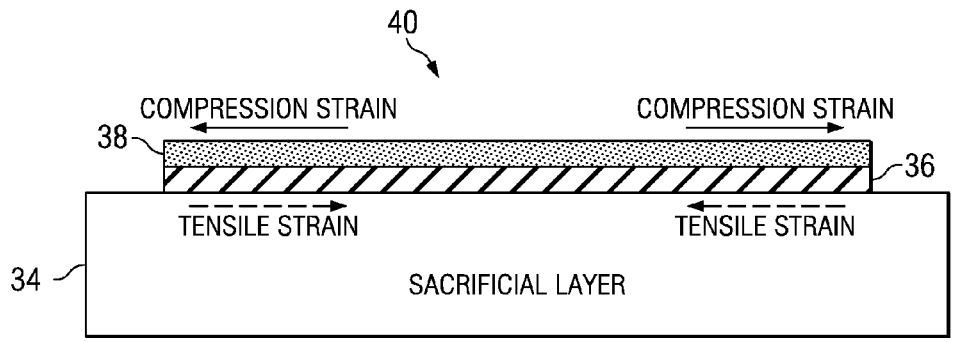
FIG. 9 schematically illustrates in a cross-section view a curved reflective surface formed on a mirror plate of a micromirror device in an exemplary fabrication process.

Referring to FIG. 9, mirror plate 40 may comprise layer 36 and layer 38. During a fabrication, layer 36, which has tensile strain, is deposited on sacrificial layer 34, such as amorphous silicon. Layer 38, which has a compression strain, is deposited on layer 36. When the sacrificial layer 34 is removed, the laminate of layers 36 and 38 is curved due to the compression and tensile strains.

Figure 10:
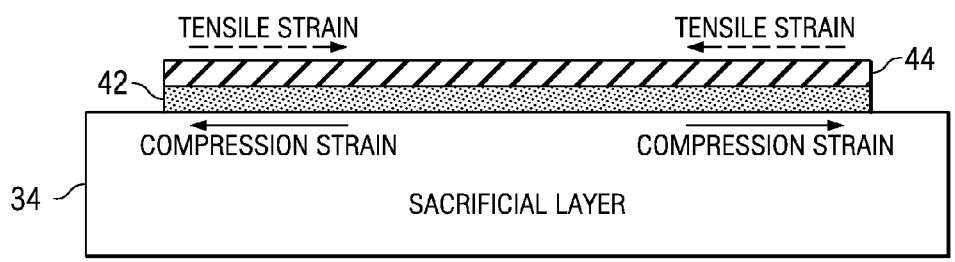
FIG. 10 schematically illustrates in a cross-section view a curved reflective surface formed on a mirror plate of a micromirror device in another exemplary fabrication process.

In another example, the layer with compression strain can be deposited on the sacrificial layer, while the layer with the tensile strain is deposited on the layer having the compression strain, as shown in FIG. 10. After removing the sacrificial layer, the laminate of layers 42 and 44 is curved, but along the opposite direction along which the laminate in FIG. 9 is curved.

In yet another example, the curved reflective surfaces can be formed by controlling the deposition stress, along with a post-bake process. For example, a first layer of aluminum with a first amount of oxygen content can be deposited followed by depositing thereon a second aluminum layer with a second amount of oxygen content that is different from the first amount. Different oxygen contents cause difference in coefficients of thermal expansion in the first and second aluminum layers. After the post-backing process, the laminated first and second layers can be deformed. Aluminum layers are only one of many possible examples. The curved reflective layer can be formed by a variety of other materials, such as metals and metalloids.

Other than oxygen, other materials, such as metallic materials (e.g. titanium) can be introduced in depositing the reflective layers. Specifically, multiple slightly dissimilar metallic layers can be deposited on top of each other such so as to form a "bi-metallic" stack. After the post-backing process, the bi-metallic layer stack can be deformed.

Provision of curved reflective surfaces for micromirrors has many other advantages. For example, it increases tolerance for packaging defects, especially defects on the light transmissive window of the package, which will be discussed in the following with reference to FIG. 11 and FIG. 12.

Figure 11:
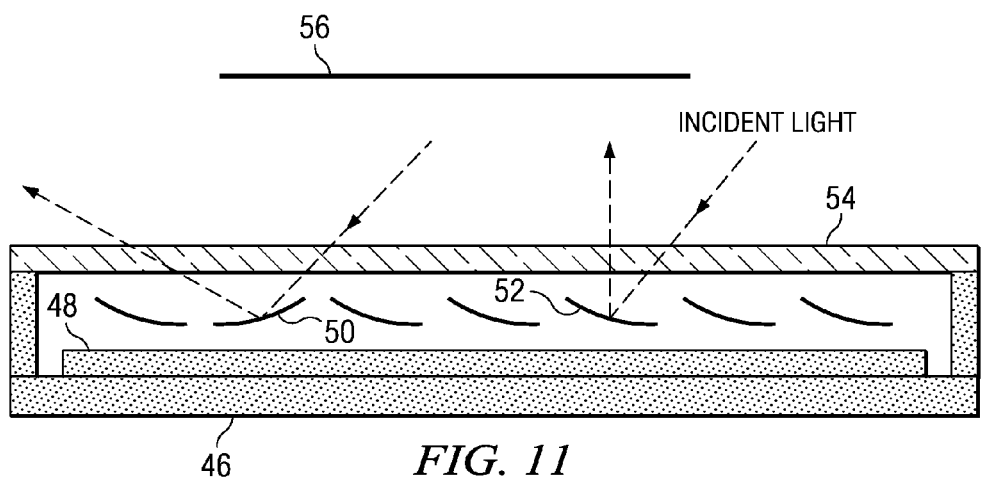
FIG. 11 illustrates therein a cross-sectional view of an array of micromirror devices in a package, wherein the micromirrors have curved reflective surfaces.

Referring to FIG. 11, an array of micromirrors having substrate 48 and curved reflective surfaces is enclosed between package cover 54 and package substrate 46. Substrate 48 of the micromirror array can be a semiconductor substrate or other suitable substrates. Package substrate 46 can be a ceramic substrate; and package cover is preferably transmissive to visible light, such as glass, quartz, or sapphire. The package cover and package substrate are bonded together so as to enclose the micromirror array therebetween for protection with the bonding may or may not be hermetic.

In operation, incident illumination light passes through the package cover and impinges the enclosed curved reflective surfaces of the micromirrors. The micromirrors individually reflect the incident light toward or away from the projection lens (and screen 56) so as to produce the desired images. Defects on the light transmissive package cover, such as defects A, B, and C as shown in FIG. 12, which can be physical defects of the package cover or contaminations residing on the surface of the package cover, may also be imaged onto the screen and become viewable. This problem can be reduced by moving as far away from the focal plane of the projection lens as possible. For example, the micromirrors can have convex reflective surfaces such that the focal plane of the convex reflective surfaces lies underneath the reflective surfaces. By aligning (or offset) the focal plane of the projection lens with (or from) the focal plane of the convex reflective surfaces, images of the defects on the package cover on the screen can be smeared or diminished to extend of non-perceivable by viewer's eyes.

The pixels having curved reflective surfaces are especially useful in image projection. An example of a display system employing pixels with curved reflective surfaces is schematically illustrated in FIG. 13.

Figure 13:
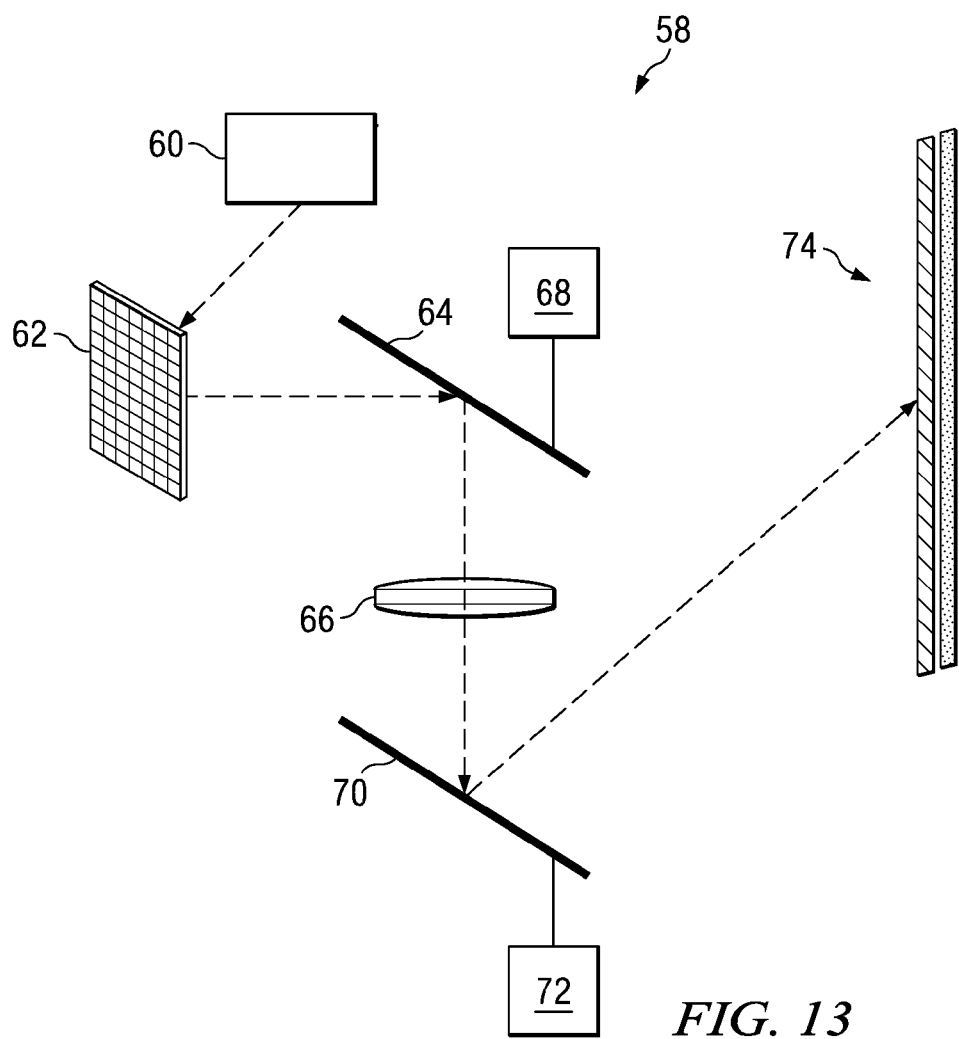
FIG. 13 is a diagram illustrating an exemplary display system employing a spatial light modulator having an array of pixels each having a reflective curved surface.

Referring to FIG. 13, display system 58 comprises illumination system 60 providing light beams to illuminate light valve 62. Light valve 62 comprises an array of pixels with curved reflective surfaces as discussed above. The pixels of the light valve modulate the incident light beams according to image data (such as bitplane data) that are derived from the desired images and video signals. The modulated light beams are then reflected by mirror 64 that reflects the modulated light beams to another mirror 70 through projection lens 66. The light beams reflected from mirror 70 are then projected to display target 74 so as to generate a pixel pattern.

Figure 14:
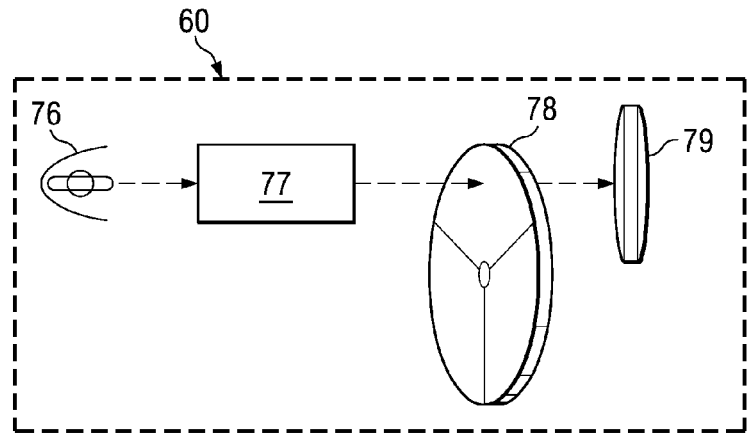
FIG. 14 illustrates a diagram of an illumination system that can be used in the display system of FIG. 13.

An exemplary illumination system 14 is illustrated in FIG. 14. Referring to FIG. 14, the illumination system comprises light source 76, light pipe 77, color wheel 78, and condensing lens 79. The light source can be an arc lamp with an elliptical reflector. The arc lamp may also be the arc lamps with retro-reflectors, such as Philips BAMI arc lamps. Alternatively, the arc lamp can be arc lamps using Wavien reflector systems each having a double parabola. The light source can also be a LED.

The color wheel comprises a set of color segments, such as red, green, and yellow, or cyan, yellow and magenta. A white or clear or other color segments can also be provided for the color wheel. In the operation, the color wheel spins such that the color segments sequentially pass through the illumination light from the light source and generates sequential colors to be illuminated on the light valve. For example, the color wheel can be rotated at a speed of at least 4 times the frame rate of the image data sent to the spatial light modulator. The color wheel can also be rotated at a speed of 240 Hz or more, such as 300 Hz or more.

The lightpipe is provided for delivering the light from the light source to the color wheel and, also for adjusting the angular distributions of the illumination light from the light source as appropriate. As an alternative feature, an array of fly's eye lenses can be provided to alter the cross section of the light from the light source.

Condensing lens 79 may have a different f-number than the f-number of projection lens 31 in FIG. 8C. In this particular example, the color wheel is positioned after the light pipe along the propagation path of the light beams. In another embodiment, the color wheel can be positioned between the lightpipe and light source, which is not shown in the figure.

In an example, mirror 64 or mirror 70 or both are movable. For example, mirror 64 can be rotated in the plane of the paper along a rotation axis that points out from the paper. Such rotation can be driven accomplished by a micro-actuator 68 (e.g. a piezo transducer and electromagnetic coil transducer) coupled to mirror 64. Similarly, mirror plate 70, if necessary, can be couple to moving mechanism 72 for rotating mirror 70.

By rotating mirror 64 or mirror 70, the pixel patterns generated by the pixels of the light valve according to the image data can be moved spatially across the image area (the area where the desired images and videos are projected) in the display target so as to obtain the projected images and videos with a higher resolution than the real physical resolution (the number of physical pixels in the light valve) of the light valve.

Figure 15:
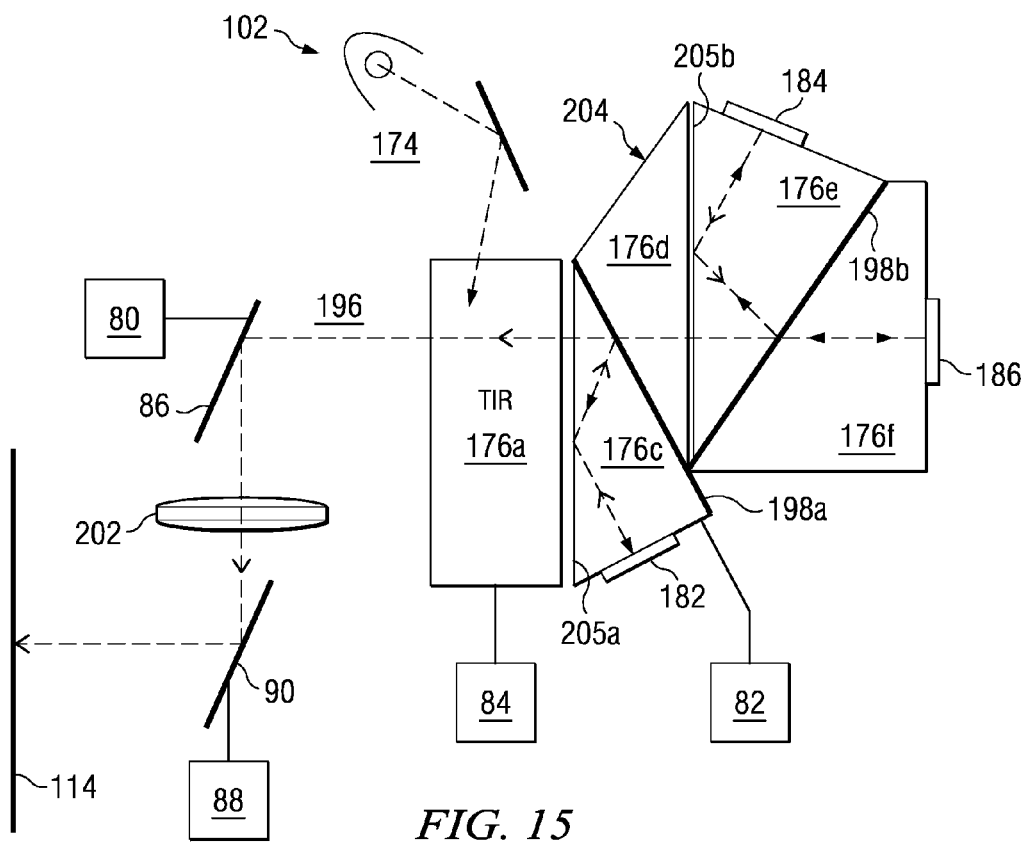
FIG. 15 illustrates a diagram of another exemplary display system employing pixels with curved reflective surfaces.

Another exemplary projection system employing micromirrors having curved reflective surface is schematically illustrated in FIG. 15.

Referring to FIG. 15, the display system comprise uses a dichroic prism assembly 204 for splitting incident light into three primary color light beams. Dichroic prism assembly comprises TIR 176a, 176c, 176d, 176e and 176f. Totally-internally-reflection (TIR) surfaces, i.e. TIR surfaces 205a and 205b, are defined at the prism surfaces that face air gaps. The surfaces 198a and 198b of prisms 176c and 176e are coated with dichroic films, yielding dichroic surfaces. In particular, dichroic surface 198a reflects green light and transmits other light. Dichroic surface 198b reflects red light and transmits other light. The three spatial light modulators, 182, 184 and 186, each having a micromirror array device, are arranged around the prism assembly.

In operation, incident white light 174 from light source 102 enters into TIR 176a and is directed towards spatial light modulator 186, which is designated for modulating the blue light component of the incident white light. At the dichroic surface 198a, the green light component of the totally internally reflected light from TIR surface 205a is separated therefrom and reflected towards spatial light modulator 182, which is designated for modulating green light. As seen, the separated green light may experience TIR by TIR surface 205b in order to illuminate spatial light modulator 182 at a desired angle. This can be accomplished by arranging the incident angle of the separated green light onto TIR surface 205b larger than the critical TIR angle of TIR surface 205b. The rest of the light components, other than the green light, of the reflected light from the TIR surface 205a pass through dichroic surface 198a and are reflected at dichroic surface 198b. Because dichroic surface 198b is designated for reflecting red light component, the red light component of the incident light onto dichroic surface 198b is thus separated and reflected onto spatial light modulator 184, which is designated for modulating red light. Finally, the blue component of the white incident light (white light 174) reaches spatial light modulator 186 and is modulated thereby. By collaborating operations of the three spatial light modulators, red, green, and blue lights can be properly modulated. The modulated red, green, and blue lights are recollected and delivered onto display target 114 through optic elements, such as projection lens 202, if necessary.

In order to produce images and video signals with a higher perceived resolution than the total number of real physical pixels in each reflective light valve (184, 186, and 182), the combined light 196 is further manipulated through mirror 86, mirror 90, and projection lens 202, wherein one or both of mirrors 86 and 90 are rotatable along axes passing their centers and pointing out from the paper. The rotations of mirrors 86 and 90 are driven by micro-actuators 80 and 88 that are respectively connected to the mirrors.

In the operation, the combined light 196 is reflected from mirror 86 towards mirror 90 through projection lens 202. The combined light after mirror 90 is reflected to display target 114 so as to generate the desired images and/or videos. By rotating mirror 86 or mirror 90, or both, the pixel patterns generated by the pixels of the light vales 182, 184, and 186 can be projected at different locations in the display target with the methods as discussed above with reference to FIG. 6A to FIG. 10. Alternative to rotating mirror 86 or mirror 90, TIR can be moved, such as vertically or horizontally or rotating within or out of the paper or any combinations thereof, by micro-actuator 84 connected thereto so as to projecting the combined light 196 at different locations. In another embodiment, projection of the combined light 196 at different locations on the display target can be accomplished by moving the triangular prism having the TIR surface of 205 and to which light valve 182 is attached. Such movement can be accomplished through micro-actuator 82 attached to the triangular prism.

It will be appreciated by those skilled in the art that a new and useful method of projecting an image using pixels having curved reflective surfaces have been described herein. In view of the many possible embodiments, however, it should be recognized that the embodiments described herein with respect to the drawing figures are meant to be illustrative only and should not be taken as limiting the scope of what is claimed. Those of skill in the art will recognize that the illustrated embodiments can be modified in arrangement and detail. Therefore, the devices and methods as described herein contemplate all such embodiments as may come within the scope of the following claims and equivalents thereof.

What is claimed is:

1. A projection system, comprising:
    an illumination system providing light;
    an array of reflective and deflectable pixels for modulating the light so as to produce an image, wherein each pixel comprises a micromirror having a movable mirror plate with a curved reflective surface and the curved reflective surfaces of the micromirrors define a focal plane; and
    projection optics for projecting the modulated light to form the image, wherein the focal plane defined by the curved reflective surfaces is not aligned to the focal plane of the projection optics.

2. The system of claim 1, wherein the focal plane of the curved reflective surfaces lies between the focal plane of the projection optics and the projection optics.

3. The system of claim 1, wherein the focal plane of the projection optics lies between the focal plane of the curved reflective surfaces and the projection optics.

4. The system of claim 1, wherein the projection optics is disposed such that an image of the curved reflective surface is projected on a screen for viewing; and wherein said image of the curved reflective surface has a predetermined dimension different from the physical dimension of the curved reflective surface.

5. The system of claim 4, wherein the predetermined dimension is substantially half a pitch size of the micromirror array with the pitch size being defined as a center-to-center distance between two adjacent micromirrors in the micromirror array.

6. The system of claim 1, wherein the micromirror array has a fill factor of 85% or more.

7. The system of claim 1, wherein the micromirror array has a fill factor of 90% or more.

8. The system of claim 6, wherein an overlap of the pixels of the produced image is 30% or less.

9. The system of claim 6, wherein an overlap of the pixels of the produced image is 10% or less.

10. The system of claim 1, wherein resolution of the pixels of the produced image is a resolution higher than a resolution of the micromirror array.

11. The system of claim 1, further comprising:
    a mechanism for causing a change of a propagation path of the modulated light such that the modulated light from each curved reflective surface can be projected onto a plurality of different locations on a screen.

12. The system of claim 11, wherein the mechanism comprises a movable mirror.

13. The system of claim 12, wherein the movable mirror is coupled to a moving mechanism.

14. The system of claim 1, wherein the array of micromirrors is enclosed in a package having a package cover that is transmissive to visible light.

* * * * *